United States Patent
Park et al.

(10) Patent No.: US 7,620,909 B2
(45) Date of Patent: Nov. 17, 2009

(54) INTERACTIVE IMAGE SEAMER FOR PANORAMIC IMAGES

(75) Inventors: Michael C. Park, Portand, OR (US); Scott Gilbert, Tucson, AZ (US)

(73) Assignee: iMove Inc., Portland, OR (US)

( * ) Notice: Subject to any disclaimer, the term of this patent is extended or adjusted under 35 U.S.C. 154(b) by 522 days.

(21) Appl. No.: 10/789,508

(22) Filed: Feb. 26, 2004

(65) Prior Publication Data

US 2004/0257384 A1 Dec. 23, 2004

Related U.S. Application Data

(63) Continuation of application No. 09/602,290, filed on Jun. 23, 2000, now abandoned, and a continuation-in-part of application No. 09/310,715, filed on May 12, 1999, now Pat. No. 6,337,683.

(60) Provisional application No. 60/142,573, filed on Jul. 6, 1999.

(51) Int. Cl.
*G06F 3/048* (2006.01)

(52) U.S. Cl. .................. 715/790; 345/592; 345/629; 345/646

(58) Field of Classification Search ................ 715/790; 345/592, 629, 646

See application file for complete search history.

(56) References Cited

U.S. PATENT DOCUMENTS

| | | | |
|---|---|---|---|
| 3,909,121 A | 9/1975 | Cardoso | |
| 4,470,779 A * | 9/1984 | Whitehouse | 418/111 |
| 4,853,764 A | 8/1989 | Sutter | |
| 4,873,585 A | 10/1989 | Blanton et al. | |
| 4,890,314 A | 12/1989 | Judd et al. | |
| 5,022,085 A * | 6/1991 | Cok | 382/284 |
| 5,023,725 A | 6/1991 | McCutchen | |
| 5,235,198 A | 8/1993 | Stevens et al. | |
| 5,404,316 A * | 4/1995 | Klingler et al. | 715/723 |
| 5,495,576 A | 2/1996 | Ritchey | |
| 5,541,773 A | 7/1996 | Kamo | |
| 5,563,649 A | 10/1996 | Gould et al. | |
| 5,649,032 A | 7/1997 | Burt et al. | |
| 5,654,751 A | 8/1997 | Richard, III | |

(Continued)

FOREIGN PATENT DOCUMENTS

EP 0 714 081 A1 5/1996

(Continued)

OTHER PUBLICATIONS

Supplementary European Search Report, EP Application No. 01989018, Mar. 10, 2006, 3 pages.

(Continued)

*Primary Examiner*—Steven P Sax
*Assistant Examiner*—Andrey Belousov
(74) *Attorney, Agent, or Firm*—Fenwick & West LLP

(57) ABSTRACT

An interactive computer program for seaming a number of images into a panorama. Various parameters which affect how the images are seamed can be changed interactively. Parameters such as position, orientation, focal length, which image will be visible where images overlap, and the opacity curve can be changed. The result of any change is immediately visible. A user can move the control points, thereby "morphing" or distorting the contribution to the panorama of an image. Each pixel is assigned an "alpha" value which indicates the opacity value of that pixel in an area where images overlap. Alpha values can be changed according to a pre-established curve. The original images are not changed. Instead, only the transform between the original images and the final panorama is changed.

7 Claims, 11 Drawing Sheets

U.S. PATENT DOCUMENTS

| | | | |
|---|---|---|---|
| 5,703,604 A | 12/1997 | McCutchen | |
| 5,708,469 A | 1/1998 | Herzberg | |
| 5,729,471 A | 3/1998 | Jain | |
| 5,748,121 A | 5/1998 | Romriell | |
| 5,764,803 A | 6/1998 | Jacquin et al. | |
| 5,850,352 A | 12/1998 | Moezzi et al. | |
| 5,872,575 A | 2/1999 | Segal | |
| 5,917,488 A | 6/1999 | Anderson et al. | |
| 5,963,247 A | 10/1999 | Banitt | |
| 5,982,951 A * | 11/1999 | Katayama et al. | 382/284 |
| 5,986,668 A | 11/1999 | Szeliski et al. | |
| 5,987,164 A | 11/1999 | Szeliski et al. | |
| 5,990,941 A | 11/1999 | Jackson et al. | |
| 5,995,108 A * | 11/1999 | Isobe et al. | 345/421 |
| 5,999,173 A | 12/1999 | Ubillos | |
| 6,009,190 A | 12/1999 | Szeliski et al. | |
| 6,018,349 A | 1/2000 | Szeliski et al. | |
| 6,043,837 A | 3/2000 | Driscoll, Jr. et al. | |
| 6,044,181 A | 3/2000 | Szeliski et al. | |
| 6,058,397 A | 5/2000 | Barrus et al. | |
| 6,064,399 A * | 5/2000 | Teo | 345/629 |
| 6,075,905 A | 6/2000 | Herman et al. | |
| 6,097,854 A | 8/2000 | Szeliski et al. | |
| 6,121,966 A | 9/2000 | Teodosio et al. | |
| 6,128,143 A | 10/2000 | Nalwa | |
| 6,133,944 A | 10/2000 | Braun et al. | |
| 6,157,747 A | 12/2000 | Szeliski et al. | |
| 6,166,729 A | 12/2000 | Acosta et al. | |
| 6,192,393 B1 | 2/2001 | Tarantino et al. | |
| 6,195,122 B1 | 2/2001 | Vincent | |
| 6,243,103 B1 | 6/2001 | Takiguchi et al. | |
| 6,246,413 B1 | 6/2001 | Teo | |
| 6,271,752 B1 | 8/2001 | Vaios | |
| 6,337,683 B1 | 1/2002 | Gilbert et al. | |
| 6,359,616 B1 | 3/2002 | Ogura et al. | |
| 6,359,617 B1 | 3/2002 | Xiong | |
| 6,392,658 B1 | 5/2002 | Oura | |
| 6,400,392 B1 | 6/2002 | Yamaguchi et al. | |
| 6,424,752 B1 | 7/2002 | Katayama et al. | |
| 6,480,229 B1 | 11/2002 | Driscoll et al. | |
| 6,549,681 B1 | 4/2003 | Takiguchi et al. | |
| 6,618,074 B1 | 9/2003 | Seeley et al. | |
| 6,624,846 B1 * | 9/2003 | Lassiter | 348/211.4 |
| 6,658,091 B1 | 12/2003 | Naidoo et al. | |
| 6,675,386 B1 | 1/2004 | Hendricks et al. | |
| 6,698,021 B1 | 2/2004 | Amini et al. | |
| 6,985,188 B1 | 1/2006 | Hurst, Jr. | |
| 7,024,488 B1 | 4/2006 | Sah | |
| 2001/0024233 A1 | 9/2001 | Urisaka et al. | |
| 2001/0043738 A1 | 11/2001 | Sawhney et al. | |
| 2003/0011619 A1* | 1/2003 | Jacobs et al. | 345/619 |
| 2004/0010804 A1 | 1/2004 | Hendricks et al. | |

FOREIGN PATENT DOCUMENTS

| | | |
|---|---|---|
| JP | 11164292 A | 6/1999 |
| JP | 2003 153250 A | 5/2003 |
| WO | WO 97/01135 A2 | 1/1997 |
| WO | WO 98/34195 A1 | 6/1998 |
| WO | WO 00/62542 | 10/2000 |

OTHER PUBLICATIONS

International Search Report and Written Opinion, PCT/US04/127392, Mar. 2, 2005.

QuickTime VR—An Image based Approach to Virtual Environment Navigation, Shenchang Eric Chan, Apple Computer Inc., ACM-O-89791-701-4/95/008, 1995.

Morita, S., et al., "Networked Video Surveillance Using Multiple Omnidirectional Cameras," IEEE Proceedings of the International Symposium on Computational Intelligence in Robotics and Automation, Jul. 16-20, 2003, pp. 1245-1250, vol. 3, Kobe, Japan.

European Search Report, EP 04 78 6563, Apr. 5, 2007, 4 pages.

Notification of Reasons for Refusal of Japan Patent Office, Japanese Patent Application No. 618,861/2000, Oct. 28, 2008, 7 Pages.

* cited by examiner

INTERACTIVE IMAGE SEAMER FOR PANORAMIC IMAGES

RELATED APPLICATIONS

This application is a continuation of U.S. Ser. No. 09/602,290 filed on Jun. 23, 2000 now abandoned; which (a) claims the benefit of U.S. Ser. No. 60/142,573 filed Jul. 6, 1999; and (b) is a continuation-in-part of U.S. Ser. No. 09/310,715 filed May 12, 1999 now U.S. Pat. No. 6,337,683. The contents of all of the foregoing are hereby incorporated by reference.

FIELD OF THE INVENTION

The present invention relates to panoramic images and more particularly to computer programs which produce panoramic images.

BACKGROUND OF THE INVENTION

A panoramic image is an image with a wide field of view. A panoramic image can have a field of view up to an entire sphere, that is 360 degrees in the horizontal dimension and 180 degrees in the vertical dimension.

Panoramic images can be computer generated using mathematical models, or they can be produced by seaming together a number of photographically captured images. The number of images which must be seamed to form a panorama is determined by the field of view of each of the images being seamed. For example a fisheye lens can capture a very wide filed of view, and as few as two such images can be seamed to form a spherical panorama.

Digital seaming technology is well developed. Computer programs are available which match the edges of images and which join a number of images to form a panorama. For example U.S. Pat. Nos. 5,023,925 and 5,703,604 describe a system for capturing images, seaming the images into panoramas, and for viewing selected portions of the panoramic images. Immersive Media Corp. (formerly Dodeca L.L.C.) located in Portland, Oreg., commercially markets a system for capturing images using a multi lens camera and for seaming images into panoramas. A image seaming program which runs on the Apple Macintosh computer system is marketed by Apple Computer Inc. under the name "The QuickTime VR Authoring Studio"

Computer programs which seam images into spherical panoramas align the images which are being seamed and then lay the end portion of one image over the end portion of an adjacent image. Generally the end portions of images that are overlapped are combined (i.e. averaged or feathered) in the area of a seam. In the overlap area, the contribution or optical dominance of each image goes from one hundred percent at the edge of the overlap region closest to the center of the image to zero percent contribution at the extreme edge of the image. The contribution can go from zero to one hundred percent on a straight line basis or according to some other selected curve.

In the area where the images overlap, visual artifacts will be created unless the images are precisely aligned. Aligning images into a panorama is particularly difficult because of warping. For example, when an image is moved in a vertical direction in order to match its vertical alignment to that of another image, the horizontal scale of the top of the image being moved is changed by a different amount than is the horizontal scale on the bottom of the image.

It is particularly difficult to align images in a multi row seamer, that is, in a seamer which joins multiple rows of images into a spherical panorama. Such seamers must align more than two edges of an image to different neighboring images.

There are a variety of other parameters which must also be selected when seaming images. Among the additional parameters is the focal length assigned to each of the images. The focal length of each image determines the image's field of view.

Thus, while it is possible to seam a number of images together to form a spherical panorama, it is very difficult to seam images into a panorama without creating visual artifacts (i.e. errors). Such visual artifacts detract from the overall visual effect. There are numerous sources of image positioning and image processing errors that create visual artifacts in seamed images. The sources of errors which produce visual artifacts in seamed images can include:

Inaccurate camera alignment between image capture,
unknown or varying focal length of the images
imprecise placement of lens nodal points when capturing images
vibration of a camera during image capture
mechanical tolerances in camera pan head mounting
film warping (i.e. the film is not flat during scanning)
optical errors or inconsistencies in the lens, film, camera or scanner
inaccurate or inconsistent image framing or registration during digitization
inaccuracy in warping an image when it is laid into a pan (i.e. the image is loaded at an incorrect angle,
focus changes made between capture of successive images With current technology, when an annoying visual artifact is detected in a seamed panorama, one or more of the images which is responsible for the artifact are edited with a program such as PhotoShop which is marketed by Adobe Corporation. The modified images are then seamed and the process is repeated if the artifact remains in the program. Alternatively, the entire seamed image can be touched up with an editor such as PhotoShop. Such operations are exceedingly tedious to perform.

Prior art seamer programs allow a user to adjust various parameters which determine how the images will be seamed, for example they allow a user to specify the image location or pitch above or below the horizon and the bank or tilt an image, that is, the angle to the horizon. However, with prior art computer program, such parameters are entered into the program, the seaming operation proceeds and then if the result is not satisfactory, the parameters must be changed and the process repeated in an iterative manner. If changes to one of the images is required, the image must be edited by using a image editor such a Adobe PhotoShop and the process is then repeated with the altered image.

SUMMARY OF THE PRESENT INVENTION

The present invention provides an interactive computer program for seaming a number of single view images (hereinafter referred to as the original single view images) into a panorama. The present invention provides a number of innovative features which make it possible to reduce or eliminate artifacts in the seamed panorama. The invention utilizes several different "windows" (a number of which can be opened at the same time) in order to facilitate the seaming process. The windows utilized by the invention include a Panorama Window, a Selected Image Window and an Alpha Window.

The Panorama Window displays the panorama as the seaming operation progresses. Each change made by the operator is (practically) immediately visible in the Panorama Window.

Superimposed on the panorama in the Panorama Window are lines which designate the edges of the areas contributed by each original single view image. A user can select an area which is projected from a particular original single view image (hereinafter referred to as the Selected Image) for further operations. A separate window can be opened to displays the Selected Image. Various parameters which affect how the Selected Image is seamed into the panorama can be changed interactively. Among the parameters that can be changes are the position, the orientation, the focal length (i.e. the field of view or magnification of the Selected Image), which image will be on top (i.e. visible) where images overlap, and the opacity curve (i.e. the averaging or feathering over space of opacity) in the area where images overlap. The result of any changes in the parameters is immediately visible in the Panorama Window.

In the Panorama Window, control points are superimposed on the area in the panorama projected from the Selected Image. The user can move the control points, thereby "morphing" or distorting the contribution to the panorama of the Selected Image. The result of how the morphing affects the seaming of the images is immediately visible to the user. The original single view images are not in fact changed. Instead when a user changes a Selected Image, only the transform between the corresponding original single view image and the final panorama is changed.

Each pixel in each of the original single view images is assigned an "alpha" value. The alpha value is a value that is in addition to the conventional red, blue and green values. The alpha value indicates the opacity value of that pixel if the pixel is in an area where two images overlap. A window (hereinafter referred to as an Alpha Window) can be opened showing a Selected Image with first and second outlined areas. The second outlined area being inside the first outlined area. All pixels inside the second area have an opacity of "1" (that is in an overlap area, they will be visible to the exclusion of pixels in an image that is underneath). All pixels outside the first curve have an opacity of zero (that is in an overlap area, they will not be visible). Between the two areas, opacity changes according to a pre-established curve. An operator can change the size of the first and second areas, and immediately see the effect on the panorama which is visible in the Panorama Window.

A table is used to store the changes to the transform required in order to arrive at the desired panorama. When a user is satisfied with the appearance of a panorama, both the resulting panorama and the table showing parameters for the transform from the original image to the panorama are saved. The original single view images are not changes.

DESCRIPTION OF A PREFERRED EMBODIMENT

Figure 1A:
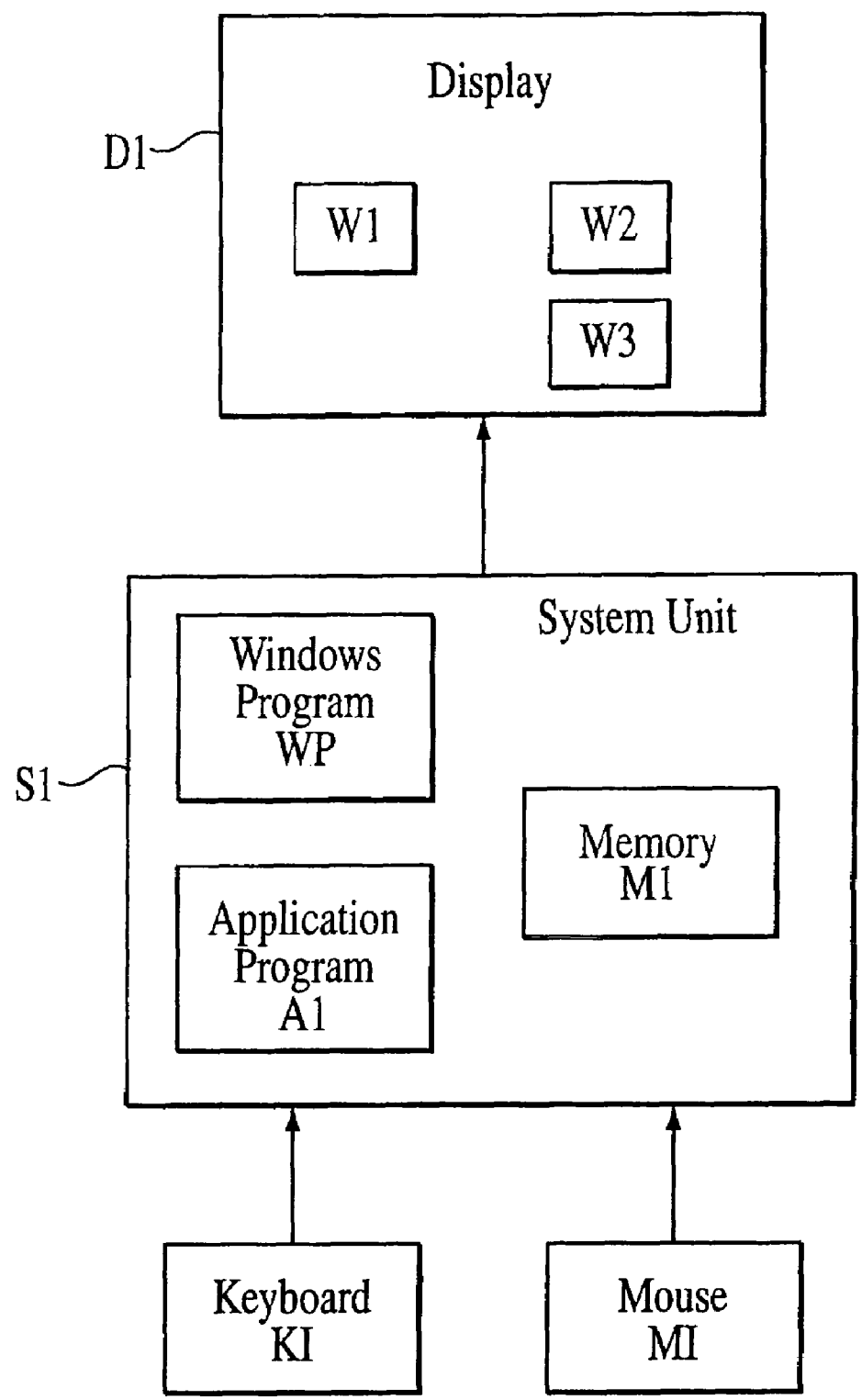
FIG. 1A is an overall diagram of the system.

The preferred embodiment of the invention operates as an application running under the widely used Windows Operating System marketed Microsoft Corporation. The overall system is shown in FIG. 1A. A display D1 displays a number of windows W1, W2 and W3. A system unit S1 controls the operations performed. System unit S1 is a conventional personal computer system unit which includes a Windows program WP, an application program A1, and a memory M1 which stores image data. The system is controlled in a conventional manner from a keyboard K1 and a mouse M1.

Figure 1B:
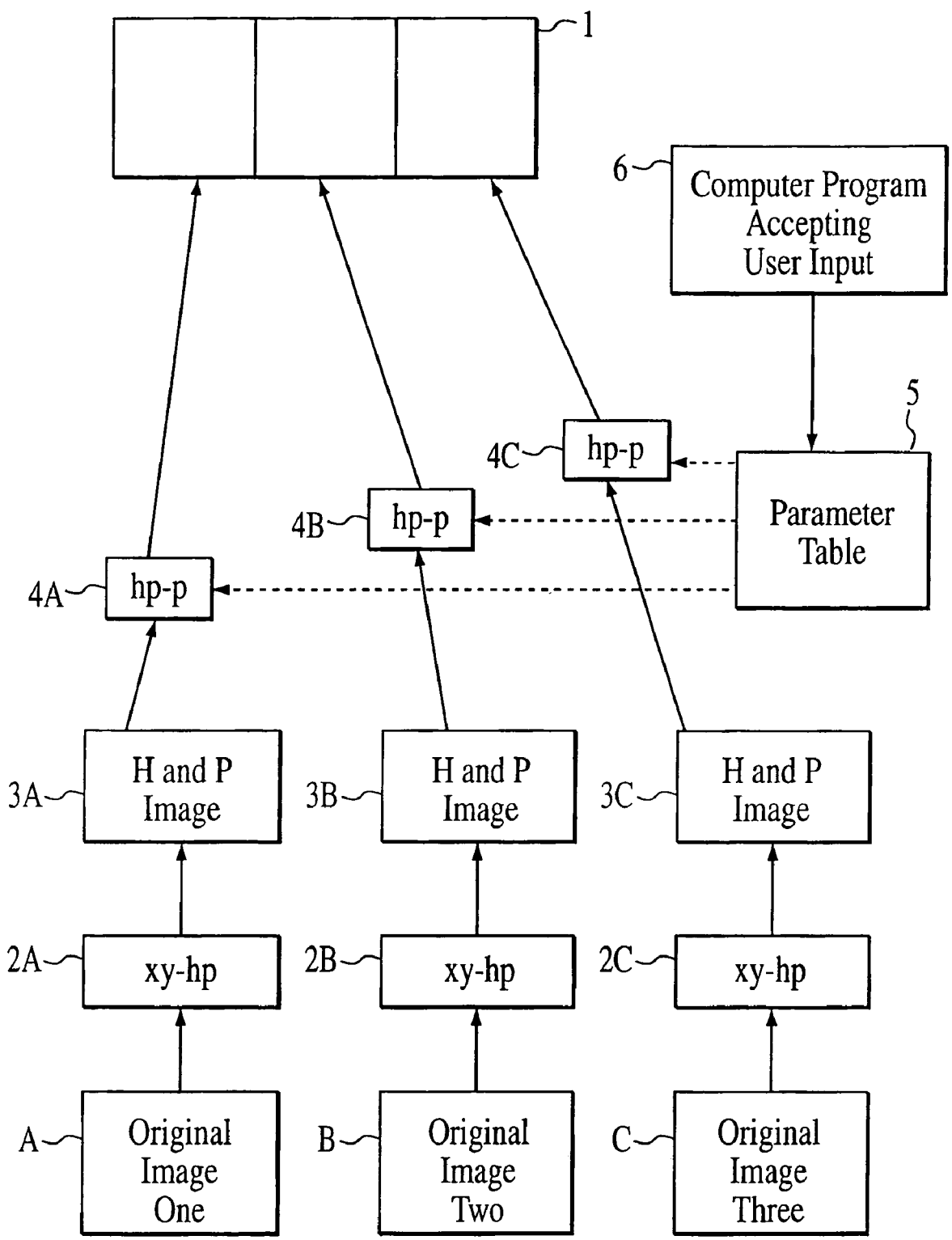
FIG. 1B is a diagram which illustrates the overall operations performed by the system.

FIG. 1B illustrates the overall operation of the application program A1. As shown in FIG. 1B, three single view images designated A, B and C are seamed into a panorama 1. It should be understood that a typical panorama will be projected from more than three single view images. Only three single view images are shown in FIG. 1B for convenience and clarity of illustration. The operation is controlled by computer program 6. The user can see the panorama and enter new commands which control the seaming operation. Thus, the operation is interactive. It is important to note that the single view images A, B and C are never changed, only the parameters in table 5 which controls the seaming operation are changed by the operator.

Transforms 2a, 2b, and 2c (which are computer program subroutines) transform each point the images A, B and C (i.e. each pixel at an x and y location) into values for Heading and Pitch (that is x,y space is transformed into HP space) 3A, 3B and 3C. Subroutines 4A, 4B and 4C then transform the images 3A, 3B and 3C into panorama 1. The operation (that is how transforms 4A, 4B and 4C operate on the images) is controlled by parameters in a parameter table 5. A computer program 6 which accepts user input generates the parameters which are stored in a parameter table 5.

A user can observe panorama 1 and enter commands in computer program 6 to change the parameters in table 5. The user can then see the effect of how the new parameters affect the panorama.

The parameters (referred to as image status) are stored in table 5 and they include:

Heading: The orientation on a 360 degree horizontal line.
Pitch: The orientation on a 180 degree vertical line
Bank: roll or orientation about a line through the center of the image.
Length: The focal length or magnification of the image
Offset X: The position in the panorama of the image in an x direction
Offset Y The position in the panorama of the image in a y direction
Brightness The intensity of the image values
Contrast: The range between light and dark The following illustrates programming code which changes the values in table 5. The field definitions are in an attachment termed Field Definitions:

Undo.Type=kUndoPosition;
Undo.Position.Heading=pSrc→Heading;
Undo.Position.Pitch=pSrc→Pitch;
Undo.Position.Bank=pSrc→Bank;
Undo.Position.Length=pSrc→Length;
Undo.Position.OffsetX=pSrc→OffsetX;

Undo.Position.OffsetY=pSrc→OffsetY;
HlpInsertUndo(pSmr, pSrc, pSmr→Undo);

The xy-hp transforms 2A, 2B, and 2C change an original single view image A, B or C which is in the xy domain into an image 3A, #b or 3C which is in the HP domain. This transformation can be calculated as follows:

```
tBool cXsRectilinear::XYtoHp(tFlt64 X, tFlt64 Y,
tFlt64 *pH, tFlt64 *pP) {
if (!mSlow) {
tFlt64 T[3]= { X – mW/2.0 – mX, Y – mH/2.0 – mY, mL };
tFlt64 V[3];
MatrixForward(V, mM, T);
if (pH) *pH= RadToDeg*atan2(V[0], V[2]);
if (pP) *ppP= RadToDeg*atan2(V[1], sqrt(V[0]*V[0] + V[2]*V[2]));
return True;
}
tInt32 x= (tInt32)(X/((tFlt64)mW/(tFlt64)kSH));
tInt32 y= (tInt32)(Y/((tFlt64)mH/(tFlt64)kSV));
tFlt64 dx= fmod(X, (tFlt64)mW/(tFlt64)kSH)/((tFlt64)mW/(tFlt64)kSH);
tFlt64 dy= fmod(Y, (tFlt64)mH/(tFlt64)kSV)/((tFlt64)mH/(tFlt64)kSV);
while (x < 0) { x+= 1; dx-= 1; }
while (y < 0) { y+= 1; dy-= 1; }
while (x > kSH – 1) { x-= 1; dx+= 1; }
while (y > kSV – 1) { y-= 1; dy+= 1; }
tFlt64 U0x= mS[y + 0][x + 0][0];
tFlt64 U0y= mS[y + 0][x + 0][1];
tFlt64 U1x= mS[y + 1][x + 0][0];
tFlt64 U1y= mS[y + 1][x + 0][1];
tFlt64 U2x= mS[y + 0][x + 1][0];
tFlt64 U2y= mS[y + 0][x + 1][1];
tFlt64 U3x= mS[y + 1][x + 1][0];
tFlt64 U3y= mS[y + 1][x + 1][1];
tFlt64 V0x= (1 – dy)*U0x + dy*U1x;
tFlt64 V0y= (1 – dy)*U0y + dy*U1y;
tFlt64 V1x= (1 – dy)*U2x + dy*U3x;
tFlt64 V1y= (1 – dy)*U2y + dy*U3y;
tFlt64 Wx= (1 – dx)*V0x + dx*V1x;
tFlt64 Wy= (1 – dx)*V0y + dx*V1y;
tFlt64 T[3]= { Wx – mW/2.0 – mX, Wy – mH/2.0 – mY, mL };
tFlt64 V[3];
MatrixForward(V, mM, T);
if (pH) *pH= RadToDeg*atan2(V[0], V[2]);
if (pP) *pP= RadToDeg*atan2(V[1], sqrt(V[0]*V[0] + V[2]*V[2]));
return True;
}
```

The h-p transforms 4A, 4B, and 4C change HP images 3A, 3B or 3C which are in the hp domain into panorama 1. This transformation can be calculated as follows:

```
tBool cXsEquirectangular::HPtoXY(tFlt64 H, tFlt64 P,
tFlt64 *pX, tFlt64 *pY) {
H*= DegToRad;
P*= DegToRad;
if (mSlow) {
tFlt64 T[3]= { sin(H)*cos(P), sin(P), cos(H)*cos(P) };
tFlt64 U[3];
MatrixInverse(U, mM, T);
H= atan2(U[0], U[2]);
P= atan2(U[1], sqrt(U[0]*U[0] + U[2]*U[2]));
} else {
P= fmod(P, 2*Pi);
if (P > +Pi/2) {
if (P < +3*Pi/2) {
H+= Pi;
P= +Pi – P;
} else {
P-= 2*Pi;
}
}
if (P < –Pi/2) {
if (P > –3*Pi/2) {
H+= Pi;
P= –Pi – P;
} else {
P+= 2*Pi;
}
}
H= fmod(H, 2*Pi);
if (H < –Pi) H+= 2*Pi;
if (H > +Pi) H-= 2*Pi;
}
while (H > mMaxH) H-= 2*Pi;
while (H < mMinH) H+= 2*Pi;
tFlt64 Wx= mW*(H – mMinH)/(mMaxH – mMinH);
tFlt64 Wy= mH*(P – mMinP)/(mMaxP – mMinP);
if (Wx < 0 || Wx > mW) return False;
if (Wy < 0 || Wy > mH) return False;
if (pX) *pX= Wx;
if (pY) *pY= Wy;
return True;
}
```

The images in the various windows include lines numerous lines. For example, there are lines that outline different images. These lines are draw as follows:

```
static tVoid HlpDrawLine(
tSmr *pSmr, tEdt *pEdt, tSrc *pSrc,
tFlt64 SrcX0, tFlt64 SrcY0,
tFlt64 SrcX1, tFlt64 SrcY1
) {
tBool Found0= False;
tBool Found1= False;
if (sqrt(
(SrcX1 – SrcX0)*(SrcX1 – SrcX0) +
(SrcY1 – SrcY0)*(Srcy1 – SrcY0)
) < 0.5
) return;
HlpUpdateSrcTransform(pSrc);
tUns32 DstW;
if (!XsPixmapGetSize(pEdt->pPixmap, &DstW, 0)) return;
tFlt64 SrcXM, SrcYM;
tFlt64 H0, P0, HM, PM, H1, P1;
tFlt64 DstX0, DstY0;
tFlt64 DstXM, DstYM;
tFlt64 DstX1, DstY1;
SrcXM= (SrcX0 + SrcX1)/2;
SrcYM= (SrcY0 + SrcY1)/2;
```

-continued

```
if (!pSrc->pTransform->XYtoHp(Srcx0, SrcY0, &H0, &P0)) goto Recurse;
if (!pSrc->pTransform->XYtoHp(srcX1, SrcY1, &H1, &P1)) goto Recurse;
Found0= pEdt->pTransform->HPtoXY(H0, P0, &DstX0, &DstY0);
Found1= pEdt->pTransform->HptoXY(H1, P1, &DstX1, &DstY1);
if (!Found0 && !Found1 && sqrt(
(SrcX1 − SrcX0)*(SrcX1 − SrcX0) +
(SrcY1 − SrcY0)*(SrcY1 − SrcY0)
) < 16
) return;
if (!Found0) goto Recurse;
if (!Found1) goto Recurse;
if (sqrt(
(DstX1 − DstX0)*(DstX1 − DstX0) +
(DstY1 − DstY0)*(DstY1 − DstY0)
) > 64
) goto Recurse;
if (!pSrc->pTransform->XYtoHp(SrcXM, SrcYM, &HM, &PM)) goto Recurse;
if (!pEdt->pTransform->HPtoXY(HM, PM, &DstXM, &DstYM)) goto Recurse;
// the point between them is roughly on the line
if (!(fabs((Dstx0 − DstXM)*(DstY1 − DstYM) − (DstY0 − DstYM)*(DstX1 − DstXM)) <
0.05 * (
sqrt((DstX0 − DstXM)*(DstX0 − DstXM) + (DstY0 − DstYM)*(DstY0 − DstYM))*
sqrt((DstX1 − DstXM)*(DstX1 − DstXM) + (DstY1 − DstYM)*(DstY1 − DstYM))
))
) goto Recurse;
if (!(((Dstx0 < DstW/2 && DstX1 < DstW/2) || (DstX0 > DstW/2 && DstX1 > DstW/2))) goto
Recurse;
XsDrawLine(pEdt->pWindow, (tInt32)DstX0, (tInt32)DstY0, (tInt32)DstX1, (tInt32)DstY1);
if ((pEdt == &pSmr->Pan) && (DstX0 < DstW/2) && (DstX1 < DstW/2)) {
XsDrawLine(pEdt->pWindow, (tInt32)(DstX0 + DstW), (tInt32)DstY0, (tInt32)(DstX1 + DstW),
(tInt32)DstY1);
}
return;
Recurse:
HIpDrawLine(pSmr, pEdt, pSrc, SrcX0, SrcY0, SrcXM, SrcYM);
HIpDrawLine(pSmr, pEdt, pSrc, SrcXM, SrcYM, SrcX1, SrcY1);
}
```

Figure 2A:
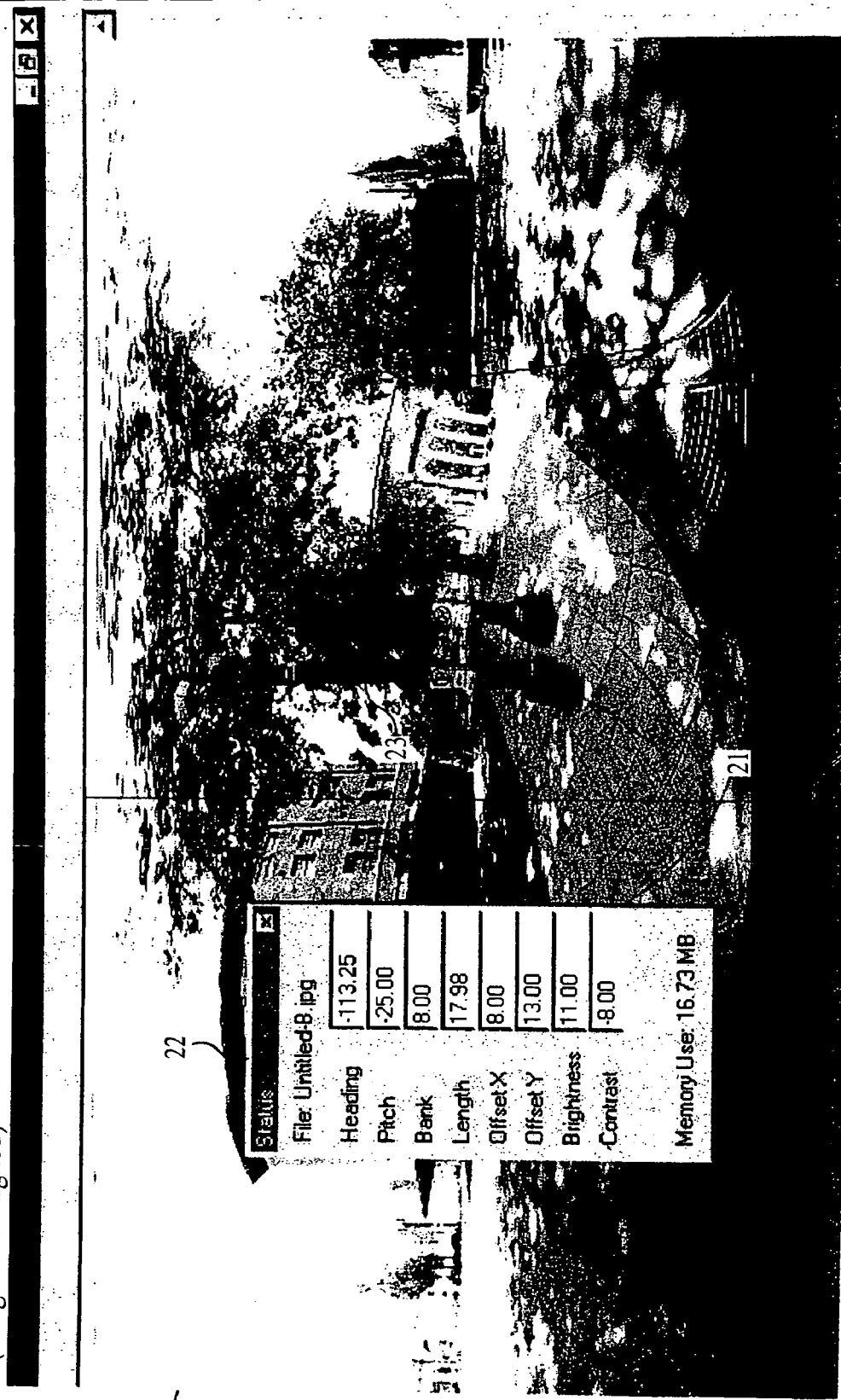
FIGS. 2A and 2B illustrate how the position in the panorama of a particular single view image can be interactively changed.
Figure 2B:
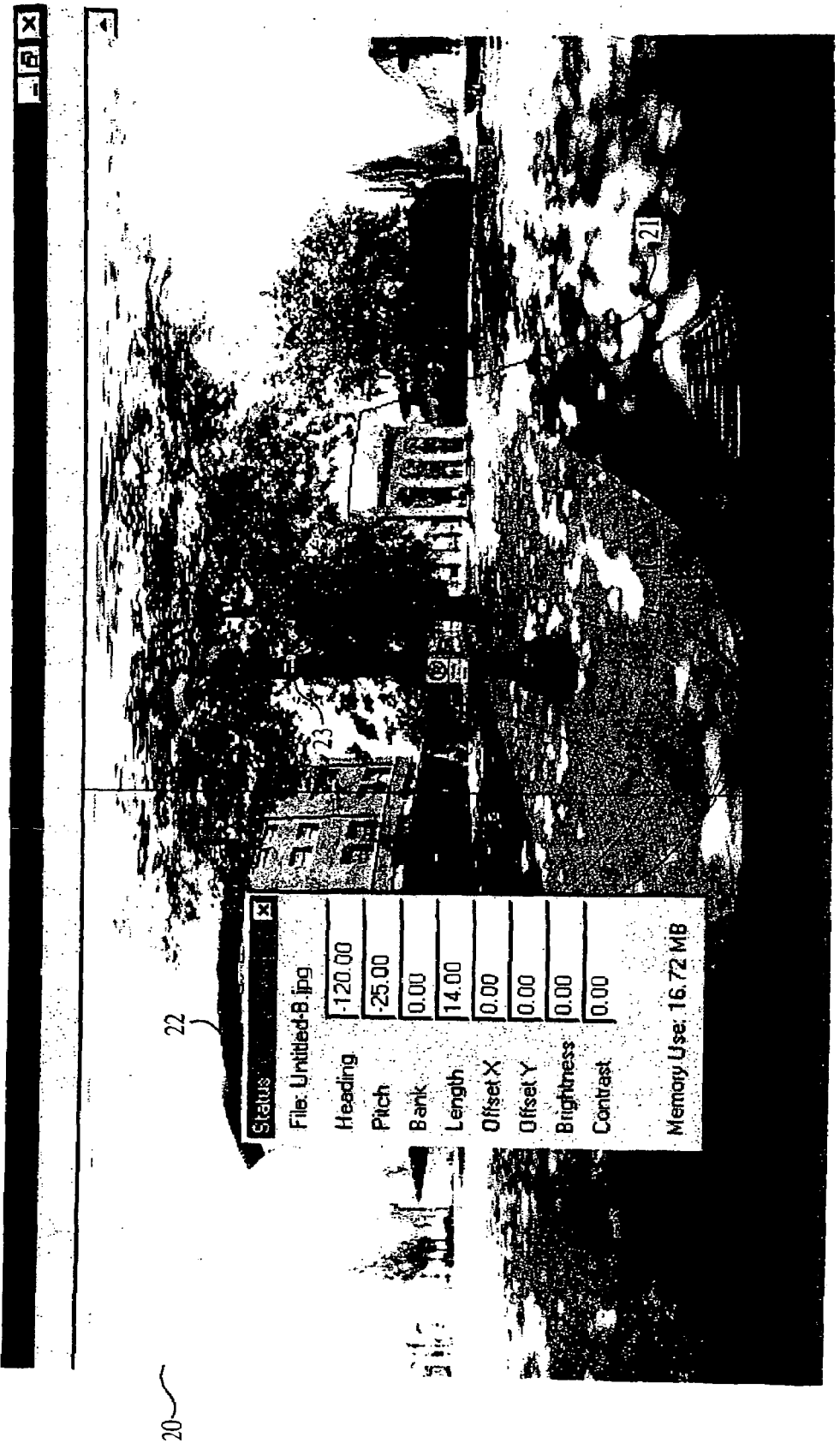

A user can interactively set or change the values of various parameters and observe the affect on the panorama. FIGS. 2A and 2B show how image 21 appears in the Panorama Window (i.e. in a panorama 20) when two different sets of parameter or status values are used. A status window 22 shows the values of the various parameters.

In FIG. 2A the image 21 is placed in panorama 20 according to the following status values:

| | |
|---|---|
| Heading: | −120.00 |
| Pitch | −25.00 |
| Bank | 0.00 |
| Length | 17.98 |
| Oftset x | 8.00 |
| Offset Y | 13.00 |
| Brightness | 11.00 |
| Contrast | −8.00 |

In FIG. 2B the image 21 is placed in panorama 20 according to the following status values:

| | |
|---|---|
| Heading: | 2.70 |
| Pitch | −25.15 |
| Bank | 6.00 |
| Length | 14.00 |
| Offset x | 0.00 |
| Offset Y | 0.00 |
| Brightness | 0.00 |
| Contrast | 0.00 |

The affect of the difference between FIGS. 2A and 2B can be seen by focusing on the lamp post 23. In FIG. 2A, the images are not overlapped properly and is appears that there are two lamp posts. When the values are changed as shown in FIG. 2B, the images are aligned properly and only a single lamp post 21 appears. With the present invention the operator can view panorama 20 and change the status values until the lamp posts are aligned.

It is noted that the original single view image 21 is not in fact changed. Only the values in table 5 are changed as show above. The result is that the panorama 20 has the different appearances as shown in FIGS. 2A and 2B. It is also noted that in FIG. 2A line 27 shows where the image wraps around. Note that the image at the right edge of the panorama is duplicated to the left of line 27.

Figure 3:
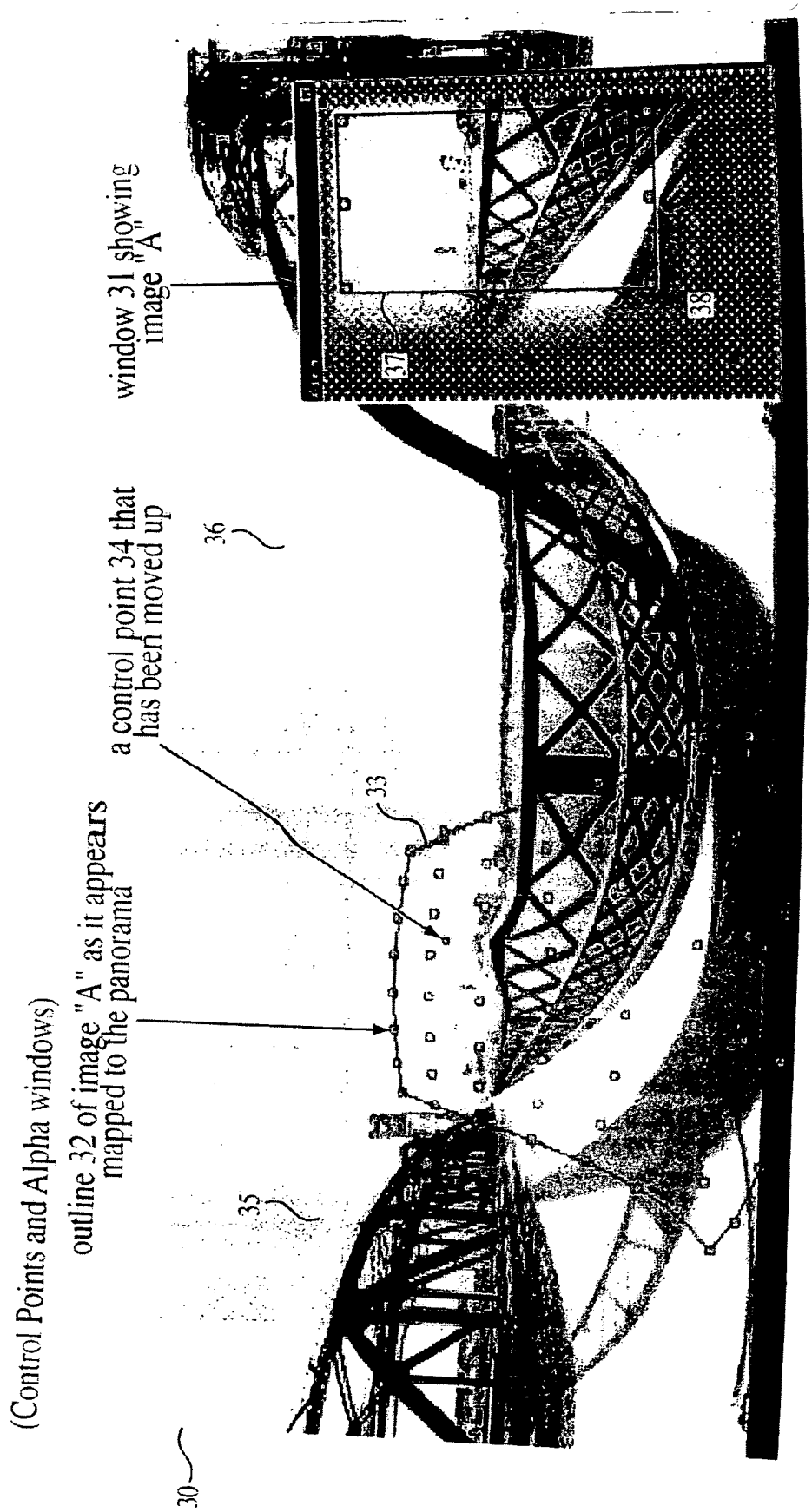
FIG. 3 shows the control points in an image and an Alpha window.

FIG. 3 shows two windows. One window is the Panorama Window showing the seamed panorama 30. The Panorama Window shows an outline 32 of a Selected Image. The area 32 is the area in panorama 30 that is projected from an original single view Image hereinafter referred to as image A. Line 36 in panorama 20 shows the outline of an area which is projected from another Original Image. If the operator "clicks" on the areas encompassed by line 36, that image would become the Selected Image.

The second window shown in FIG. 3, namely window 31 is an Alpha Window which displays the original image A with two superimposed lines designating two areas 37 and 38. The location and size of areas 37 and 38 can be changed by the operator by merely dragging the corner points as is conventional. Inside area 37 all pixels have an alpha value (i.e. and opacity) of 1. Outside area 38 all pixels have an alpha value of zero. In this embodiment the opacity of pixels between areas 37 and 38 change in a linear manner.

In the Selected Image 32, a number of control points 33 are superimposed on the image. These control points can be moved by the user (by dragging in the normal manner that items are dragged on a Microsoft Windows screen). The result is that the images is changed or morphed. For example note the control point 34 which has been moved. Note the distortion in the bridge railing. The contribution to the panorama 30 by other single view images are shown by lines 35 and 36.

It is noted that when a user moves one of the control points the image information near the control point is warped. This local warp control is independent of placement or movement of the image within the panorama. The ability to distort part of an image is extremely useful for matching image information in two or more images files that have the same imagery in an overlap area.

Lines 37 and 38 in window 31 show how the averaging or feathering of an image can be controlled interactively. The location and shape of boxes 37 and 38 can be moved by dragging. The contribution to the panorama of image A goes from 100 percent in the area covered by box 37 to zero in the area outside box 38.

Of particular importance is the fact that with the present invention, an operator can change the contribution of an image to a panorama without changing the initial image itself. The movement of the control points and the shape of the opacity windows 37 and 38 are stored in the parameter table 5. Thus the resulting panorama can be stored as a complete panorama, or the original images plus the values in the parameter table can be stored and exactly the same panorama can thereby be re-created.

Figure 4:
FIG. 4 shows how the overlap of images can be viewed.

FIG. 4 illustrates a Viewer Window 41 which can be opened so that an operator can see a perspectively correct image at the same time that the panorama is being viewed. FIG. 4 also shows the overlap of two images 42 and 43. One can more accurately find errors or artifacts in the seaming operation by simultaneously viewing both the panorama and a perspectively corrected portion of the panorama. By controlling the opacity of each image in the overlap area, the images can be seamed without artifacts appearing in the panorama.

Figure 5A:
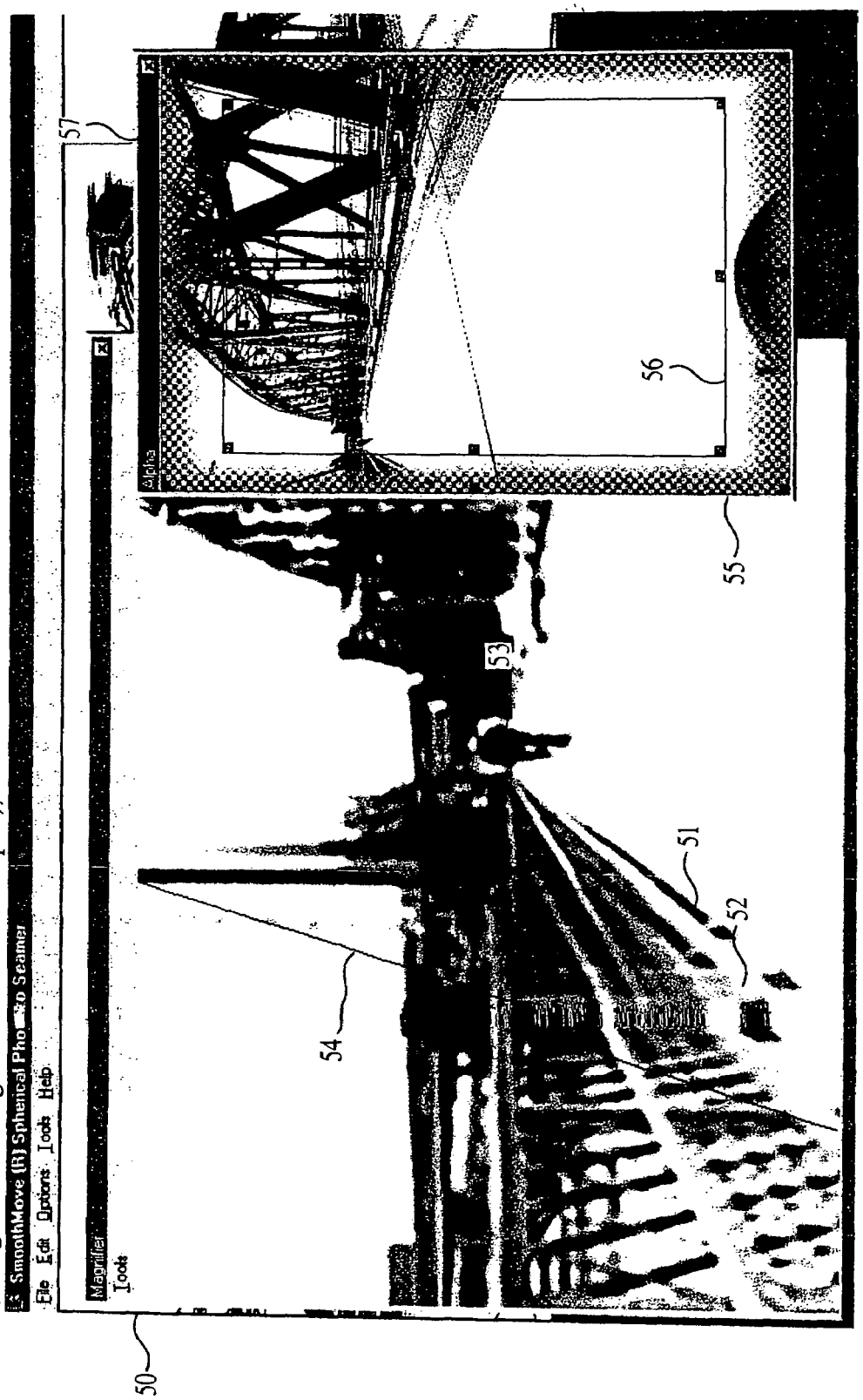
FIGS. 5A and 5B show the affect of changing the areas in an Alpha Window.
Figure 5B:
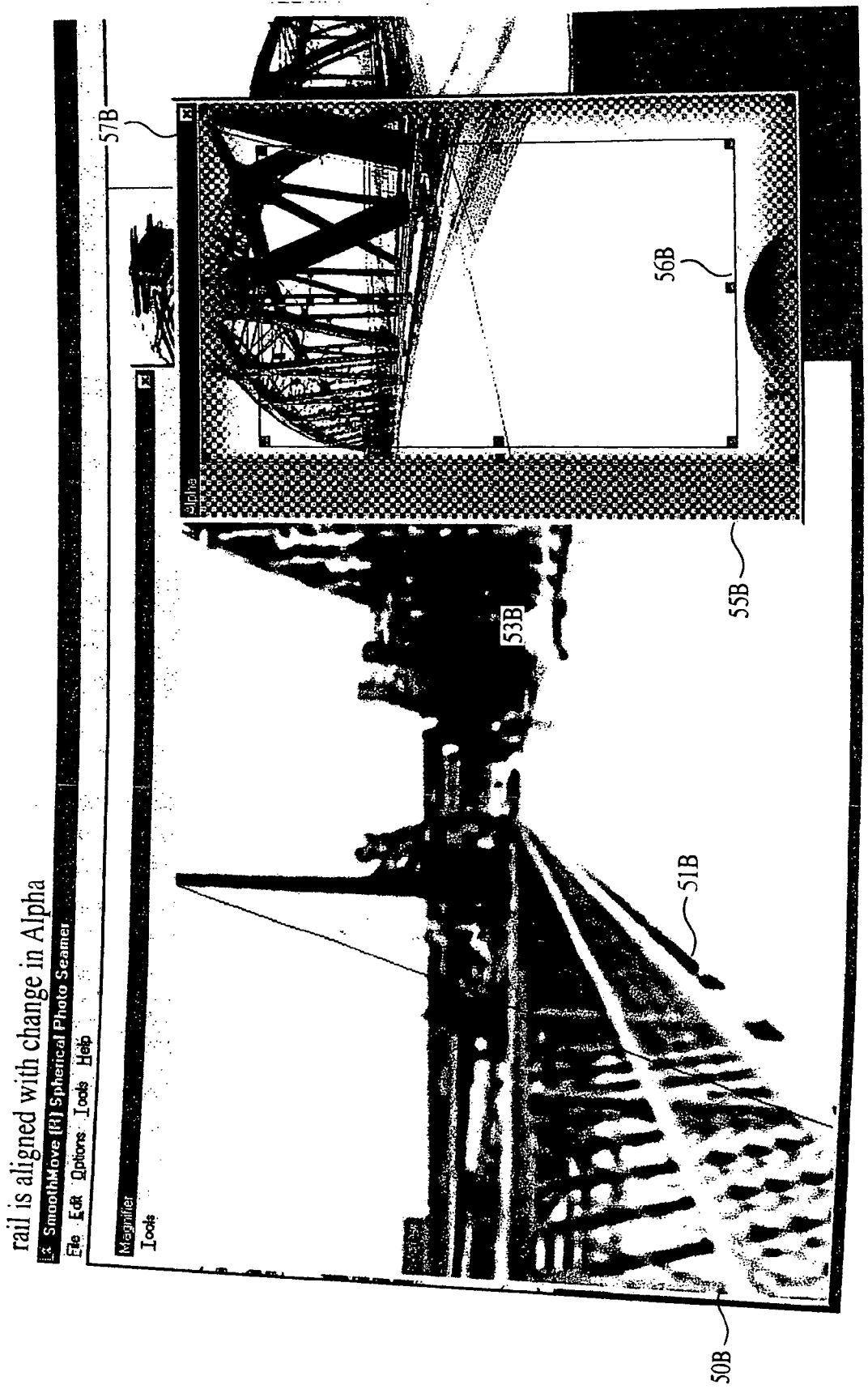

FIGS. 5A and 5B illustrate how the Alpha window (which shows the opacity of the pixels) for a Selected Single view image can be used to eliminate artifacts in a panorama. In FIG. 5A shows the railing twice namely the items marked 51 and 52. The fact that the railing is shown twice in the panorama 50 means that two Single View Images have captured the railing and as the images are projected into the panorama 50, the railing from both Single View images is visible in the panorama 50.

This artifact can be corrected by use of the Alpha Window 57. The Alpha window 57 has a line 56 which encompasses an area where the opacity is 1 and an line 55 which encompasses an area outside of which the opacity is zero. Between areas 55 and 56 the opacity varies linearly from zero to one.

FIG. 5B shows the effect of moving (i.e. dragging) lines 55 and 56 to locations designated 55B and 56B. Note that in the panorama 50B only one railing is visible. The change in opacity prevents the image of the railing from the second single view image to be visible in the panorama.

Note that the bicycle rider 53. In the Alpha window 57 the bicycle rider is within line 56 in FIG. 5A. In FIG. 5B the bicycle rider is not within line 56B. Thus the bicycle rider visible in panorama 50B is projected from a different single view image than the single view image shown in Alpha Window 57. FIGS. 5A and 5B illustrate how moving lines 55 and 56 in the alpha Window 57 can be used to affect the panorama and to remove artifacts.

It is noted that in the preferred embodiment described herein, the opacity varies linearly from zero to one as one moves from area 55 to 56. In alternate embodiments, the variation can be according to a curve or function other than a linear function.

The following code illustrates how the Alpha values are set bases on the area set in the Alpha Window:

```
tVoid XsAlphaRectangular(
tVoid **ppDstRows, tUns32 W, tUns32 H,
tInt32 InnerX, tInt32 InnerY, tUns32 InnerW, tUns32 InnerH,
tInt32 OuterX, tInt32 OuterY, tUns32 OuterW, tUns32 OuterH
) {
if (!ppDstRows) return;
tPix32 **ppDst= (tPix32 **)ppDstRows;
tInt32 InnerL= InnerX;
tInt32 InnerR= InnerX + InnerW;
tInt32 InnerT= InnerY;
tInt32 InnerB= InnerY + InnerH;
tInt32 OuterL= OuterX;
tInt32 OuterR= OuterX + OuterW;
tInt32 OuterT= OuterY;
tInt32 OuterB= OuterY + OuterH;
if (OuterL < 0) OuterL= 0;
if (OuterR < 0) OuterR= 0;
if (OuterT < 0) OuterT= 0;
if (OuterB < 0) OuterB= 0;
if (OuterL > (tInt32)W) OuterL= (tInt32)W;
if (OuterR > (tInt32)W) OuterR= (tInt32)W;
if (OuterT > (tInt32)H) OuterT= (tInt32)H;
if (OuterB > (tInt32)H) OuterB= (tInt32)H;
if (OuterR < OuterL) OuterR= OuterL;
if (OuterB < OuterT) OuterB= OuterT;
if (InnerL < OuterL) InnerL= OuterL;
if (InnerR < OuterL) InnerR= OuterL;
if (InnerT < OuterT) InnerT= OuterT;
if (InnerB < OuterT) InnerB= OuterT;
if (InnerL > OuterR) InnerL= OuterR;
if (InnerR > OuterR) InnerR= OuterR;
if (InnerT > OuterB) InnerT= OuterB;
if (InnerB > OuterB) InnerB= OuterB;
if (InnerR < InnerL) InnerR= InnerL;
if (InnerB < InnerT) InnerB= InnerT;
tInt32 X, Y;
tInt32 A, dA;
tUns08 a;
for (Y= 0; Y<(tInt32)H; Y++) {
for (X= 0; X<(tInt32)W; X++) {
ppDst[Y][X].a= 255;
}
}
for (X= 0; X<OuterL; X++) {
for (Y= 0; Y<(tInt32)H; Y++) {
ppDst[Y][X].a= 0;
}
}
A= 0<<16;
dA= (InnerL > OuterL) ? (255<<16)/(InnerL − OuterL) : 0;
for (X= OuterL; X<InnerL; X++) {
a= (tUns08)(A>>16);
A+= dA;
for (Y= 0; Y<(tInt32)H; Y++) {
ppDst[Y][X].a= a;
}
}
A= 255<<16;
dA= (OuterR > InnerR) ? (−255<<16)/(OuterR − InnerR) : 0;
for (X= InnerR; X<OuterR; X++) {
a= (tUns08)(A>>16);
A+= dA;
for (Y= 0; Y<(tInt32)H; Y++) {
ppDst[Y][X].a= a;
}
}
```

```
        for (X= OuterR; X<(tInt32)W; X++) {
            for (Y= 0; Y<(tInt32)H; Y++) {
                ppDst[Y][X].a= 0;
            }
        }
        for (Y= 0; Y<OuterT; Y++) {
            for (X= 0; X<(tInt32)W; X++) {
                ppDst[Y][X].a= 0;
            }
        }
        A= 0<<16;
        dA= (InnerT > OuterT) ? (255<<16)/(InnerT − OuterT) : 0;
        for (Y= OuterT; Y<InnerT; Y++) {
            a= (tUns08)(A>>16);
            A+= dA;
            for (X= 0; X<(tInt32)W; X++) {
                if (a < ppDst[Y][X].a) ppDst[Y][X].a= a;
            }
        }
        A= 255<<16;
        dA= (OuterB > InnerB) ? (−255<<16)/(OuterB − InnerB) : 0;
        for (Y= InnerB; Y<OuterB; Y++) {
            a= (tUns08)(A>>16);
            A+= dA;
            for (X= 0; X<(tInt32)W; X++) {
                if (a < ppDst[Y][X].a) ppDst[Y][X].a= a;
            }
        }
        for (Y= OuterB; Y<(tInt32)H; Y++) {
            for (X= 0; X<(tInt32)W; X++) {
                ppDst[Y][X].a= 0;
            }
        }
    }
```

Figure 6A:
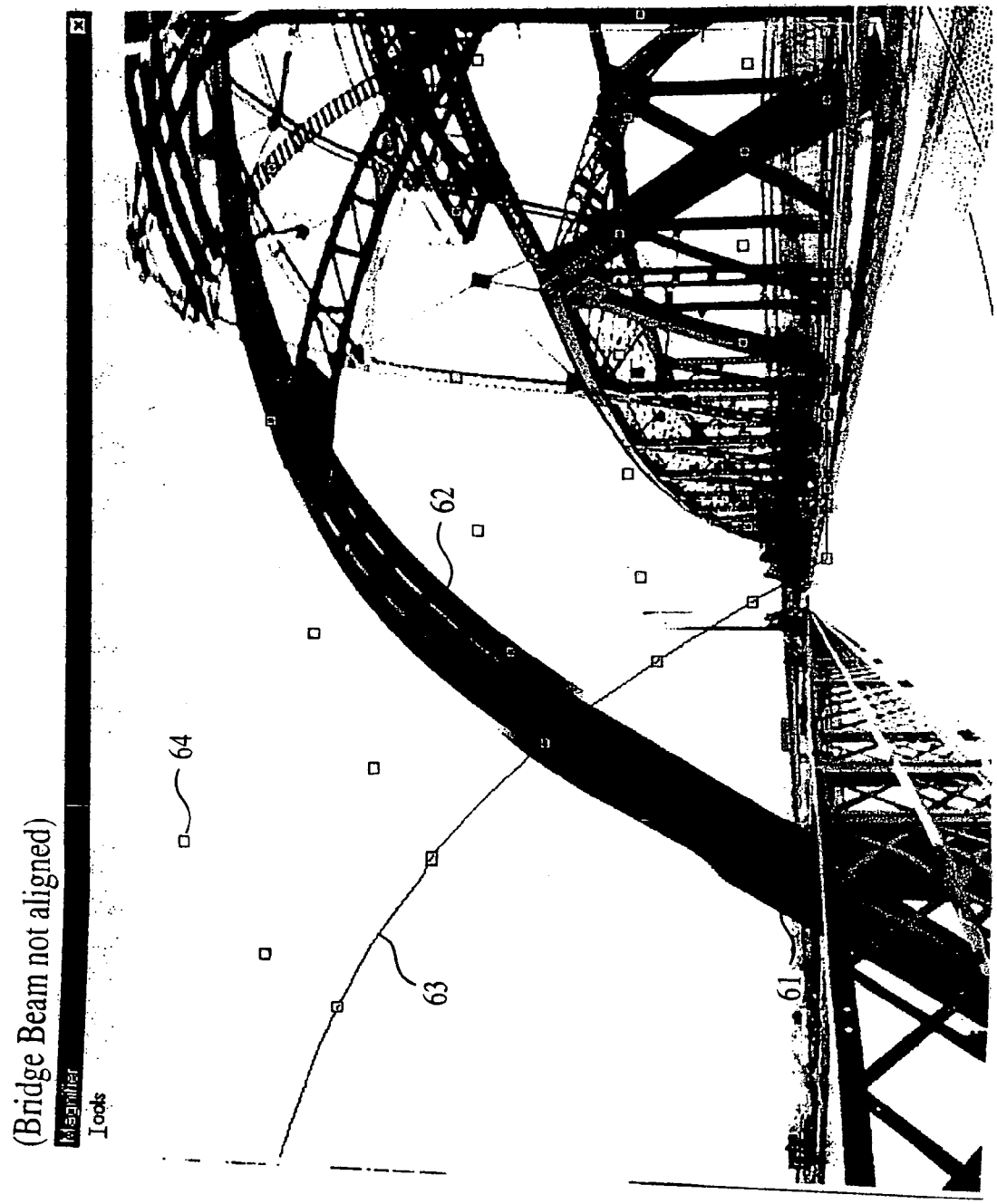
FIGS. 6A and 6B show the affect of moving the control points in a Selected Image.
Figure 6B:
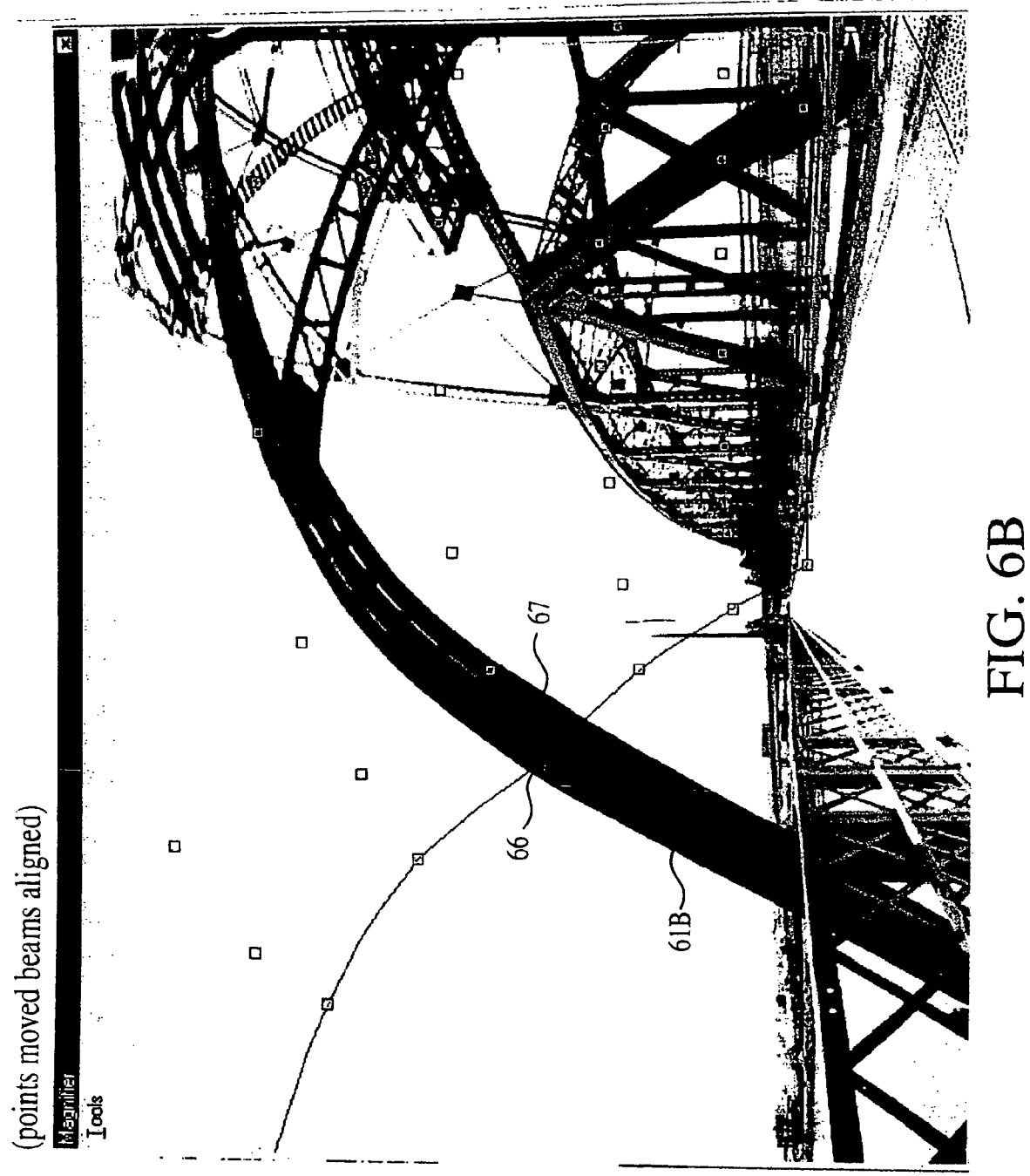

FIGS. 6A and 6B show how dragging control points can be used to aligned items visible in the panorama. In FIG. 6A beam 61 which is projected from one single view image does not match beam 62 which is projected from a different single view image. By moving points 66 and 67 as shown in FIG. 6B, the image is distorted (morphed) so that the beams 61B and 6B are aligned.

In situations where a panorama is formed by seaming together more than two single view images, the edges of each image must be matched to several adjacent images. Prior art software seamers utilize a software function that attempts to make a "best fit" in the position of each individual pair of images. This is typically done as each image is loaded into the Seamer. An image is placed with reference only to one other image. The present invention allows each images to be placement adjusted with reference to all of its neighboring images. This is useful in preventing the propagation or accumulation of matching errors all in one spot. That is, it prevents a situation where making an adjustment to match one edge may aggravate the mismatch on another edge.

The following code illustrates how the control points are handled:

```
tBool cXsRectilinear::GetControlPoint(tUns32 Index,
    tFlt64 *pH tFlt64 *pP) {
    if (Index < 0) return False;
    if (Index >= (kSH + 1)*(kSV + 1)) return False;
    tFlt64 X= mS[Index/(kSH + 1)][Index%(kSH + 1)][0];
    tFlt64 Y= mS[Index/(kSH + 1)][Index%(kSH + 1)][1];
    tFlt64 T[3]= { X − mW/2.0 − mX, Y − mH/2.0 − mY, mL };
    tFlt64 V[3];
    MatrixForward(V, mM, T);
    if (pH) *pH= RadToDeg*atan2(V[0], V[2]);
    if (pP) *pP= RadToDeg*atan2(V[1], sqrt(V[0]*V[0] + V[2]*V[2]));
    return True;
}
tBool cXsRectilinear::SetControlPoint(tUns32 Index, tFlt64 H, tFlt64 P) {
    if (Index < 0) return False;
    if (Index >= (kSH + 1)*(kSV + 1)) return False;
    H*= DegToRad;
    P*= DegToRad;
    tFlt64 T[3]= { sin(H)*cos(P), sin(P), cos(H)*cos(P) };
    tFlt64 U[3];
    MatrixInverse(U, mM, T);
    if (U[2] <= 1.0e−12) return False;
    tFlt64 L= mL/U[2];
    tFlt64 Wx= U[0]*L + mW/2.0 + mX;
    tFlt64 Wy= U[1]*L + mH/2.0 + mY;
    mS[Index/(kSH + 1)][Index%(kSH + 1)][0]= Wx;
    mS[Index/(kSH + 1)][Index%(kSH + 1)][1]= Wy;
    mSlow= True;
    mMinX= mS[0][0][0];
    mMaxX= mS[0][0][0];
    mMinY= mS[0][0][1];
    mMaxY= mS[0][0][1];
    for (tInt32 y= 0; y<(kSV + 1); y++) {
        for (tInt32 x= 0; x<(kSH + 1); x++) {
            if (mS[y][x][0] < mMinX) mMinX= mS[y][x][0];
            if (mS[y][x][0] > mMaxX) mMaxX= mS[y][x][0];
            if (mS[y][x][1] < mMinY) mMinY= mS[y][x][1];
            if (mS[y][x][1] > mMaxY) mMaxY= mS[y][x][1];
        }
    }
    return True;
}
tVoid cXsRectilinear::ResetControlPoints() {
    for (tInt32 y= 0; y<(kSV + 1); y++) {
        for (tInt32 x= 0; x<(kSH + 1); x++) {
            mS[y][x][0]= (tFlt64)x*mW/kSH;
            mS[y][x][1]= (tFlt64)y*mH/kSV;
        }
    }
    mSlow= False;
}
tVoid cXsRectilinear::SetLength(tFlt64 L) {
    mL= L;
}
tVoid cXsRectilinear::SetOffset(tFlt64 X, tFlt64 Y) {
    mX= X;
    mY= Y;
}
cXsIsomorph::cXsIsomorph(tUns32 w, tUns32 h) {
    mW= w;
    mH= h;
    mRX= 0;
    mRY= 0;
    mRW= mW;
    mRH= mH;
    if (mRW < 1.0e−6) mRW= 1.0e−6;
    if (mRH < 1.0e−6) mRH= 1.0e−6;
}
tBool cXsIsomorph::XYtoHP(tFlt64 X, tFlt64 Y, tFlt64 *pH,
    tFlt64 *pP) {
    /* Handled by the clipping rect of XsUnwrap
    if (X < 0) return False;
    if (Y < 0) return False;
    if (X > mW) return False;
    if (Y > mH) return False;
    */
    if (X < mRX) return False;
    if (Y < mRY) return False;
    if (X > mRX + mRW) return False;
    if (Y > mRY + mRH) return False;
    if (pH) *pH= (X − mRX)/mRW;
    if (pP) *pP= (Y − mRY)/mRH;
    //if (pH) *pH= X/mW;
    //if (pP) *pP= Y/mH;
    return True;
}
tBool cXsIsomorph::HPtoXY(tFlt64 H, tFlt64 P, tFlt64 *pX,
    tFlt64 *pY) {
    if (H < 0) return False;
    if (P < 0) return False;
    if (H > 1) return False;
```

-continued

```
    if (P > 1) return False;
    tFlt64 X= mRX + H*mW;
    tFlt64 Y= mRY + P*mH;
    if (X < 0) return False;
    if (Y < 0) return False;
    if (X > mW) return False;
    if (Y > mH) return False;
    if (pX) *pX= X;
    if (pY) *pY= Y;
    return True;
}
tBool cXsIsomorph::TooFar(tFlt64 X0, tFlt64 Y0, tFlt64 X1, tFlt64 Y1) {
    (void) X0;
    (void) Y0;
    (void) X1;
    (void) Y1;
    return False;
};
tVoid cXsIsomorph::SetRect(tFlt64 X, tFlt64 Y, tFlt64 W, tFlt64 H) {
    mRX= X;
    mRY= Y;
    mRW= W;
    mRH= H;
    if (mRW < 1.0e-6) mRW= 1.0e-6;
    if (mRH < 1.0e-6) mRH= 1.0e-6;
}
```

Figure 7A:
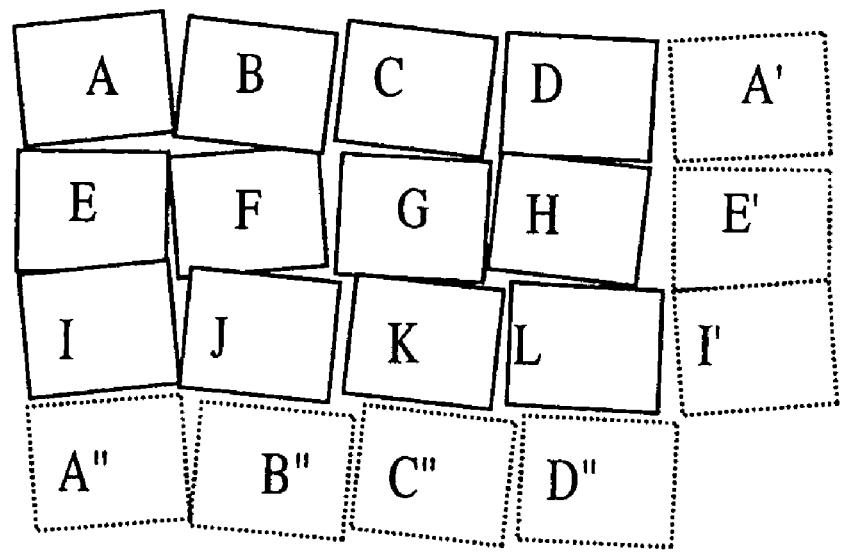
FIGS. 7A and 7B illustrate the problem of aligning multiple images to form a panorama.

FIG. 7A illustrates a 360 degree panorama made by joining twelve single view images designated A to L. The images A, E and I are duplicated on the right side of the figure and they are shown by dotted lines and designated A', B' and C'. This is meant to illustrate that the panorama wraps around on itself. For similar reason the images A, B, C and D are duplicated using dotted lines on the bottom of the figure to indicate that the panorama wraps around on itself in this direction.

Figure 7B:
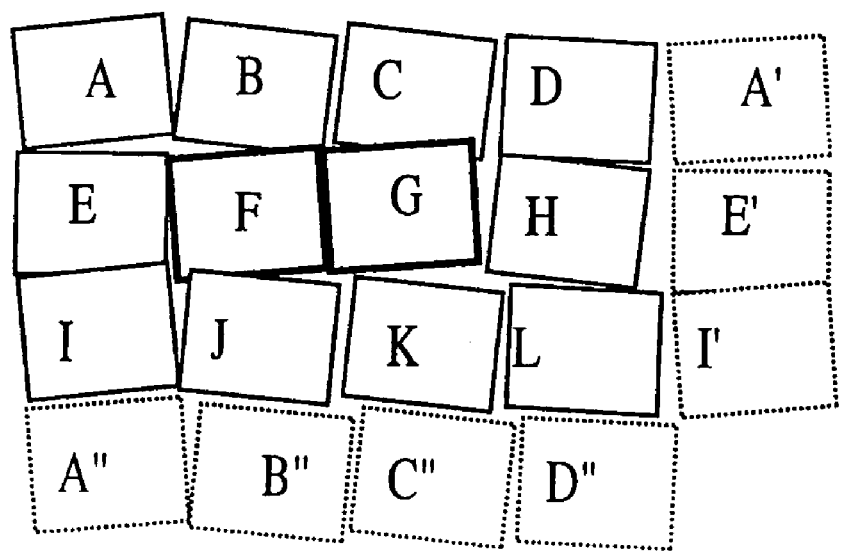

FIG. 7B illustrates what can happen is image G is moved to match its edge with image F. In correcting the mismatch between images F and G, the mismatch between images G and C and between images G and K was aggravated. The present invention addresses the above described problem using the following technique. Consider that the matching process begins with images F and G (which images are chosen as a starting point is not relevant since the arrangement wraps around in both directions). The amount of movement required to match the edge of image G to the edge of image F (hereinafter referred to as Δx, Δy, ΔØ) is calculated in a conventional manner. However, image G is only moved one half of Δx, Δy, ΔØ. The process would then be repeated for each of the other images that make up the panorama. Next the entire process is repeated. The process is repeated as many times as necessary to achieve the desired amount of overall matching. The number of iterations and the amount of calculations required to achieve a desired degree of matching is considerably less using this technique than is required if an images is initially moved the entire calculated amount.

Other useful features the preset invention include:

User control of Lay down order. When multiple image files are combined to create one panorama, having control of the lay down order, that is which image is "above or on top" of its neighboring images is very useful in concealing image artifacts.

Artificial horizon adjustment: Typically when shooting a panorama, great attention is give to ensuring the pan head is level with reference to the horizon. If this is not done the resulting pan image's displayed horizon will "wobble" as a user is viewing the panorama in a circular motion.

Individual image focal length can also be adjusted. Changing an individual images focal length while it is "in place" next to its adjacent images allows easy determination of the exact correct focal length for that single image. This is particularly useful when the camera was focused at different settings (causing different focal lengths) for each individual image taken.

The present invention allows the user to specify exactly where the horizon is in a panorama while it is being prepared. This can reduce the panhead cost and photographers time in shooting the individual images.

Multiple view windows can be simultaneously displayed, showing perspectively correct view as well as warped representation.

The invention provides, high resolution zoom in windows that allow extremely close examinations of artifacts without requiring the high resolution representation of the whole panorama.

The invention provides for position adjustment without changing the current warp of an individual image when it is moved up or down. This is very useful for correcting images or for placing images in their correct position when a portion of the images is inadvertently removed or cropped out by typical image processing operations. With a conventional seamer program it is difficult or impossible to correctly insert such a "damaged" image in to a panorama.

The preferred embodiment of the present invention is implemented as an application running under the widely used Microsoft Windows operating system. The facilities for performing general functions such as for opening multiples windows, for displaying images in windows, for selecting areas, for moving points, etc. are provided by the normal Microsoft Windows operating system facilities. Appendices A to G show the source code for subroutines which are used in an embodiment of the present invention. The subroutines in Appendices A to G can not be compiled into an entire operable program by themselves. Those skilled in the art will understand how to use the subroutines given in Appendices A to G to implement the invention as described herein.

The following is a definition of the fields utilized in code-given above:

```
struct tUndo {
    tUndoType Type;
    union {
        struct {
            tFlt64 Brightness;
            tFlt64 Contrast;
        } Color;
        struct {
            tFlt64 Heading;
            tFlt64 Pitch;
            tFlt64 Bank;
            tFlt64 Length;
            tFlt64 OffsetX;
            tFlt64 OffsetY;
        } Position;
        struct {
            tUns32 I;
            tFlt64 H;
            tFlt64 P;
        } Control;
        struct {
            tInt32 InnerX;
            tInt32 InnerY;
            tUns32 InnerW;
            tUns32 InnerH;
            tInt32 OuterX;
            tInt32 OuterY;
            tUns32 OuterW;
            tUns32 OuterH;
        } Alpha;
```

```
};
};
struct tSrc {
    cXsRectilinear *pTransform;
    tXsPixmap *pPixmap;
    tChar *pFileDir;
    tChar *pFileName;
    cList<tUndo> UndoList;
    cList<tUndo> RedoList;
    tFlt64 Heading;
    tFlt64 Pitch;
    tFlt64 Bank;
    tFlt64 Length;
    tFlt64 OffsetX;
    tFlt64 OffsetY;
    tFlt64 Brightness;
    tFlt64 Contrast;
    tUns32 AlphaOuterX;
    tUns32 AlphaOuterY;
    tUns32 AlphaOuterW;
    tUns32 AlphaOuterH;
    tUns32 AlphaInnerX;
    tUns32 AlphaInnerY;
    tUns32 AlphaInnerW;
    tUns32 AlphaInnerH;
};
struct tNew {
    tChar *pFileName;
    tChar *pFileDir;
    tFlt64 Heading;
    tFlt64 Pitch;
    tFlt64 Bank;
    tFlt64 Length;
    tFlt64 OffsetX;
    tFlt64 OffsetY;
    tFlt64 Brightness;
    tFlt64 Contrast;
};
struct tEdt {
    tBool Active;
    tBool Invalid;
    // Unwrapping Fields
    tXsWindow *pWindow;
    tXsPixmap *pPixmap;
    tXsPixmap *pBackup;
    cXsOrientable *pTransform;
    // Dragging Fields
    tFlt64 DragSrcX;
    tFlt64 DragSrcY;
    tFlt64 DragSrcH;
    tFlt64 DragSrcP;
    tFlt64 DragSrcB;
    tFlt64 DragSrcL;
    tInt32 DragDstX;
    tInt32 DragDstY;
    tFlt64 DragDstH;
    tFlt64 DragDstP;
    tUns32 DragControl;
    tBool DragStarted;
    tSelected Selected;
};
struct tSmr {
    cList<tSrc *> *pSrcList;
    cList<tNew *> *pNewList;
    tUns32 EdtMask;
    tEdt Pan;
    tEdt Vwr;
    tEdt Mag;
    tBool Outlining;
    tBool ControlPoints;
    tBool Translucent;
    tBool Antialiasing;
    tBool FilledDrag;
    tBool FastArrows;
    tSrc *pOutlineSrc;
    tXsWindow *pWndColor;
    tXsWindow *pWndAlpha;
    tXsWindow pWndStatus;
    tXsWindow *pWndThread;
    tXsWindow *pWndError;
    cList<tChar *> *pErrList;
```

The previous explanation and the code given above is meant to describe and illustrate the principles of the invention. From the above an ordinarily skilled programmer can write an operable program to practice the invention. The details involved in writing and compiling a complete fully operational program to practice the invention are within the skill of the art of a programming professional. The programming implementation details form no part of the present invention.

In the interest of full disclosure a microfiche appendix is provided with this application. The microfiche appendix provides code for a commercially viable Seamer Program which operates according to the principles of this invention. For completeness the microfiche appendix also provide commercially viable code for an Editor Program and for a Viewer Program. The code provided herewith in microfiche form is normally distributed on a CD along with various other normal conventional housekeeping programs such as a loader program and INI files. The CD also contains a copy of the program configured to operate on a Macintosh computer.

A CD has been submitted with this application which includes the code in the appendix along with the housekeeping code. It is again noted that the various details of implementation form no part of the invention.

While the invention has been described with respect to a preferred embodiment thereof, it should be understood that various changes in form and detail may be made without departing from the spirit and scope of the invention. The applicant's invention is limited only by the appended claims.

We claim:

1. An interactive seamer apparatus for seaming two or more single view images vertically or horizontally into a panoramic image, comprising:
   a user interface comprising:
      a first display area configured to display:
         a panoramic image generated from the two or more single view images having overlapping portions, each pixel in the overlapping portions encompassed by an outlined area having an opacity value that is determined by the location of the pixel in the outlined area and a predetermined opacity curve;
         an array of two or more control points superimposed within an area in the panoramic image corresponding to an interior of a selected single view image for manually warping parts of the panoramic image corresponding to the selected single view image by moving the control points, the interior of the selected single view image excluding four corners of the selected single view image;
      a second display area configured to display a selected single view image projected from the panoramic image, opacity values of pixels in the overlapping portions manually adjusted by changing a size of an outlined area of the selected single view image in the second display area;
   a third display area configured to display values of parameters; and
   a fourth display area configured to display a perspectively corrected view of the selected single view image, the fourth display displayed simultaneously with the first display area; and an image seamer configured to seam the two or more single view images vertically or horizontally based on locations of the control points and the size of the outlined area in the second display area.

2. The interactive seamer of claim 1, wherein the image seamer is further configured to seam the two or more single view images based on the focal length of a selected portion of the panoramic image.

3. The interactive seamer of claim 1, wherein the parameters comprise at least one parameter associated with high resolution zoom to enable a user to examine artifacts without requiring a high resolution representation of the entire panoramic image.

4. The interactive seamer of claim 1, wherein the parameters comprise at least one parameter specifying an artificial horizon in the panoramic image.

5. The interactive seamer of claim 1, wherein the parameters comprise at least one parameter specifying a lay down order of the two or more single view images.

6. The interactive seamer of claim 1, wherein the warped single view image is repositioned within the panoramic image responsive to receiving a user input.

7. A computer-implemented method of interactively seaming single view images vertically or horizontally in a partly overlapping manner into a panoramic image, comprising:

displaying a panoramic image generated from the two or more single view images in a first display area of a user interface;

displaying at least one of two or more single view images projected from the panoramic image in a second display area of the user interface, the two or more single view images having overlapping portions at least partially encompassed by at least one outlined area, each pixel in the overlapping portions encompassed by the outlined area having an opacity value that is determined by the location of the pixel in the outlined area and a predetermined opacity curve;

changing the opacity values of the pixels in the overlapping portions responsive to receiving first user inputs representing changing of a size of an outlined area in the second display area;

superimposing an array of two or more control points within an area in the panoramic image corresponding to an interior of a selected single view image, the interior of the selected single view image excluding four corners of the selected single view image;

warping parts of the panoramic image corresponding to the selected single view image responsive to receiving second user inputs for moving the control points;

displaying values of parameters;

displaying a perspectively corrected view of the selected single view image, the perspectively corrected view displayed simultaneously with the panoramic image;

seaming the two or more single view images vertically or horizontally in a partly overlapping manner into the panoramic image based on locations of the control points and the size of the outlined area in the second display area; and storing the panoramic image.

* * * * *